United States Patent
Hickman Guevara et al.

(10) Patent No.: US 10,814,830 B2
(45) Date of Patent: Oct. 27, 2020

(54) START/STOP ENGINE BUTTON ASSEMBLY INCORPORATING AN AUTOMATED BUTTON COVER

(71) Applicant: FORD GLOBAL TECHNOLOGIES, LLC, Dearborn, MI (US)

(72) Inventors: Alfonso Hickman Guevara, Tlalnepantla (MX); David Mercado Velazquillo, Mexico City (MX); Raul Ezequiel Alvarez Ruiz, Mexico City (MX); Luis Jesus Chavela Guerra, Mexico City (MX); Luis Olmos Gonzalez, Tlalnepantla (MX)

(73) Assignee: Ford Global Technologies, LLC, Dearborn, MI (US)

( * ) Notice: Subject to any disclaimer, the term of this patent is extended or adjusted under 35 U.S.C. 154(b) by 239 days.

(21) Appl. No.: 15/928,924

(22) Filed: Mar. 22, 2018

(65) Prior Publication Data
US 2019/0291690 A1  Sep. 26, 2019

(51) Int. Cl.
| | | |
|---|---|---|
| *B60R 25/045* | (2013.01) | |
| *B60R 25/31* | (2013.01) | |
| *B60K 28/04* | (2006.01) | |
| *B60N 2/00* | (2006.01) | |

(52) U.S. Cl.
CPC .......... *B60R 25/045* (2013.01); *B60K 28/04* (2013.01); *B60R 25/31* (2013.01); *B60N 2/002* (2013.01); *B60Y 2302/01* (2013.01)

(58) Field of Classification Search
CPC ....... B60R 25/045; B60R 25/21; B60R 25/31; B60K 28/02; B60K 28/04; B60K 37/06; H01H 2221/032; H01H 2231/026; H01H 2239/04
USPC ......................................................... 180/273
See application file for complete search history.

(56) References Cited

U.S. PATENT DOCUMENTS

| | | | | |
|---|---|---|---|---|
| 4,578,592 A | * | 3/1986 | Nakazawa ............. | B60K 37/06 180/78 |
| 5,261,502 A | * | 11/1993 | Kronholm, Jr. ........ | B60K 37/06 180/90 |
| 5,388,691 A | * | 2/1995 | White .................... | A45C 11/00 206/305 |
| 5,441,325 A | * | 8/1995 | Toth ....................... | B60J 3/0282 296/97.2 |
| 5,706,909 A | * | 1/1998 | Bevins ................... | B60R 25/04 180/273 |
| 5,823,599 A | * | 10/1998 | Gray ...................... | B60K 37/00 296/37.8 |

(Continued)

OTHER PUBLICATIONS

"Lamborghini Lp 700 4 Aventador Push Start Button"; 2017 Automotive.com; http://www.automotive.com/news/popular-push-button-startstop-feature-pushes-nhtsa-for-new-regulations-69963/photo_01.html; p. 1 of 1.

(Continued)

*Primary Examiner* — Frank B Vanaman
(74) *Attorney, Agent, or Firm* — David Coppiellie; King & Schickli, PLLC

(57) ABSTRACT

A start/stop engine button assembly includes a start/stop engine button, a button cover, displaceable between a closed position and an open position, and an actuator that functions to displace the button cover between the closed position and the opened position.

11 Claims, 8 Drawing Sheets

(56) References Cited

U.S. PATENT DOCUMENTS

| | | | | |
|---|---|---|---|---|
| 5,988,840 | A * | 11/1999 | Wirtz | B60Q 1/05 |
| | | | | 362/496 |
| 6,604,776 | B2 | 8/2003 | Edwards | |
| 6,914,205 | B2 * | 7/2005 | Galea | B60K 37/06 |
| | | | | 200/43.01 |
| 7,616,977 | B1 * | 11/2009 | Nortman | B60R 11/02 |
| | | | | 174/66 |
| 7,826,934 | B1 * | 11/2010 | Schowalter | B60K 37/00 |
| | | | | 701/1 |
| 8,264,338 | B2 * | 9/2012 | Leon | B60K 37/06 |
| | | | | 340/456 |
| 2002/0152828 | A1 * | 10/2002 | Nagasaka | B60K 37/06 |
| | | | | 74/473.3 |
| 2003/0029261 | A1 * | 2/2003 | DeJonge | B60K 37/06 |
| | | | | 74/335 |
| 2014/0001834 | A1 * | 1/2014 | Rudolph | B60K 37/06 |
| | | | | 307/9.1 |

OTHER PUBLICATIONS

Engine Start/Stop Button Cover Trim for Ford Mustang 2015, 2016, 2017; Amazon.com; https://www.amazon.com/Engine-Start-Button-Cover-Mustang/dp/B0711NLD86; printed Dec. 29, 2017; pp. 1-5.
Shineka Car Styling Engine Start/Stop Button Cover Trim Start Switch Cover Interior Decoration for Ford Mustang 2015+; Shineka; https://www.aliexpress.com/item/Unique-Design-ABS-Keyless-Start-Button-Cover-Ford-Mustang-Start-Switch-Cover-Interior-Decoration-for-Ford/32821710119.html; printed Dec. 29, 2017; pp. 1-3.
Nissan/Nismo R35 GT-R Start Button Cover in Gloss Red with Standard Ring; JRS Auto Designs; https://jrsautodesigns.com/products/nissan-nismo-r35-gt-r-start-button-cover-two-tone-gloss-red-with-black-gt-letters-with-standard-ring; pp. 1-2.

* cited by examiner

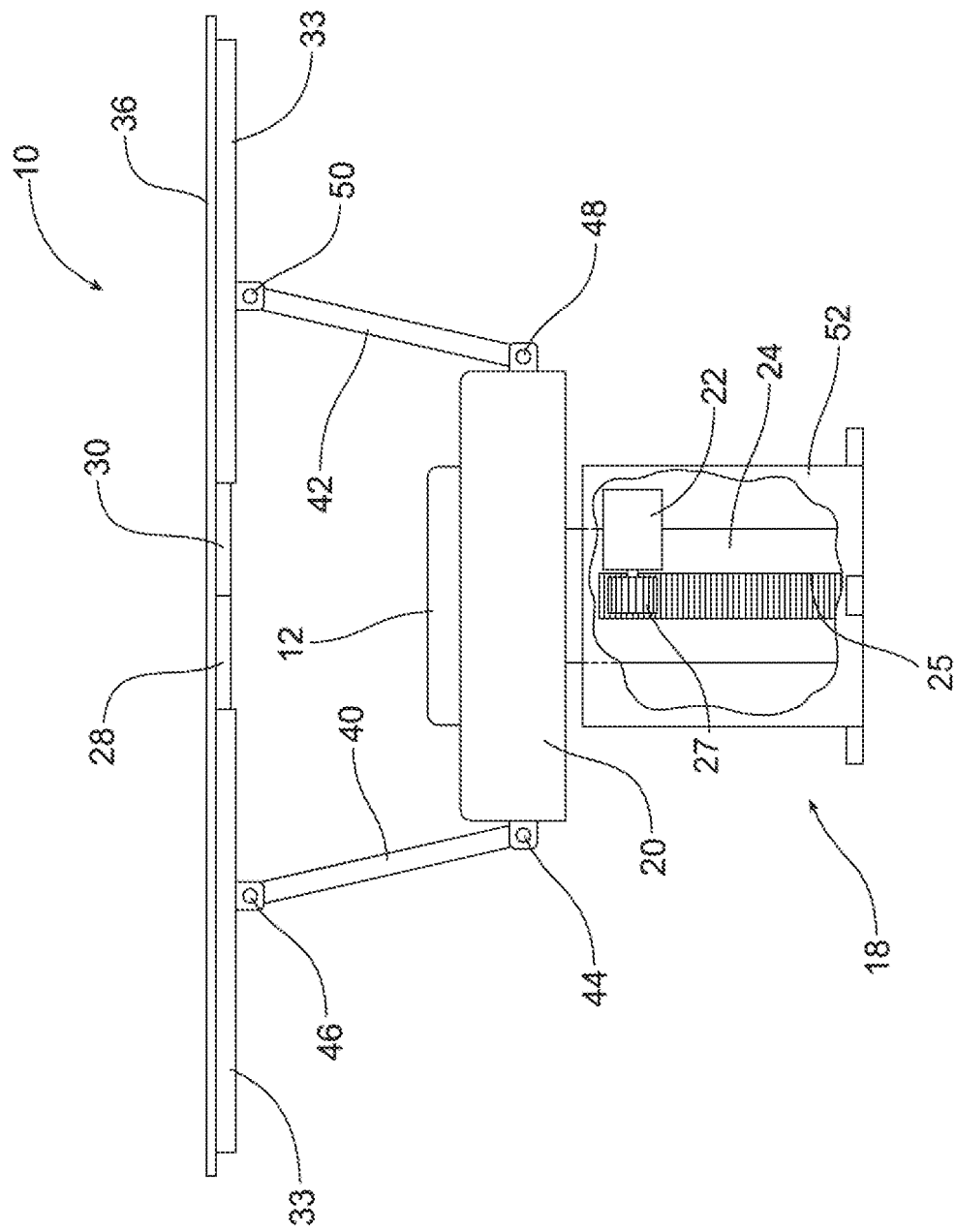

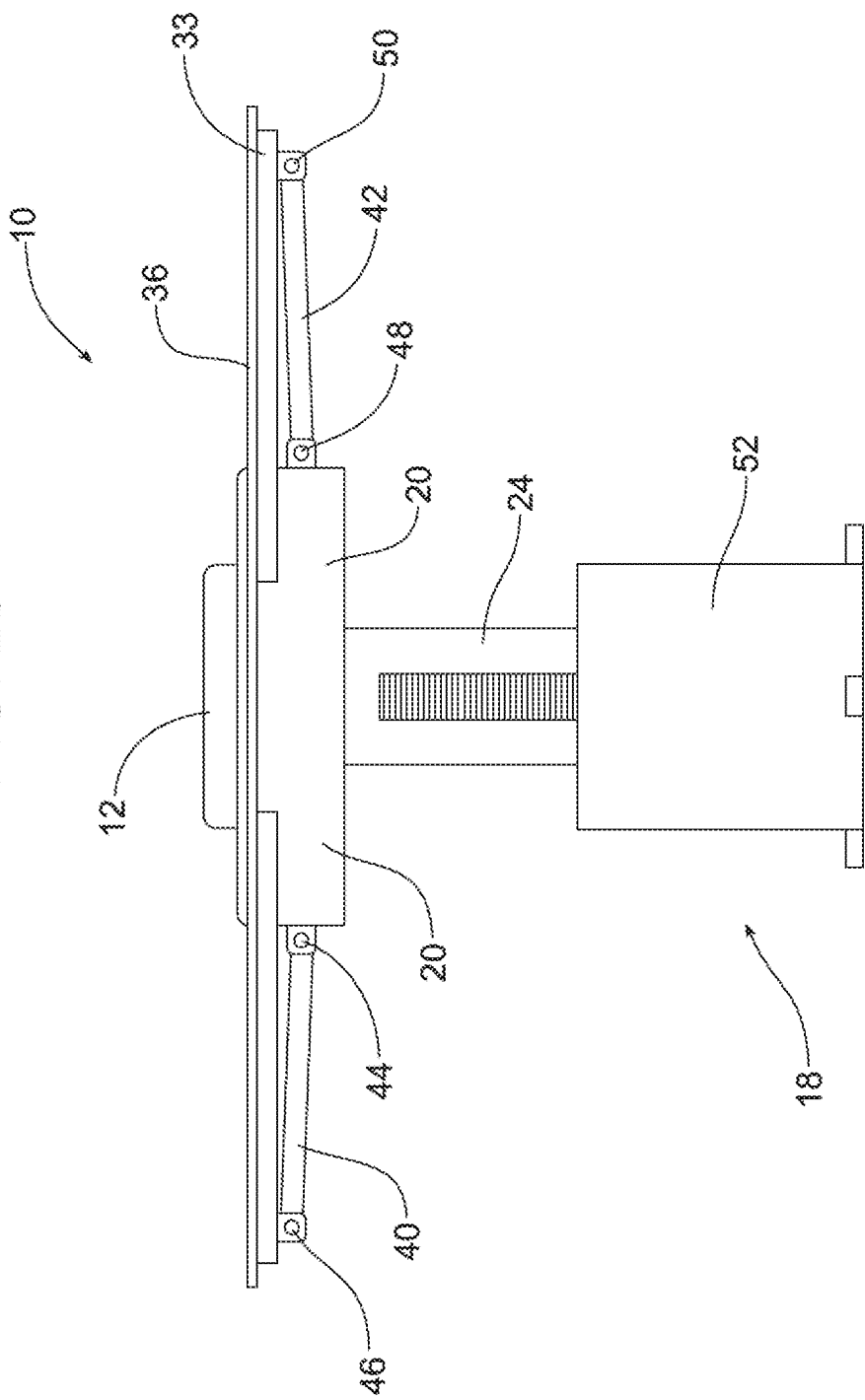

START/STOP ENGINE BUTTON ASSEMBLY INCORPORATING AN AUTOMATED BUTTON COVER

TECHNICAL FIELD

This document relates generally to the motor vehicle equipment field and, more particularly, to a new and improved start/stop engine button assembly that incorporates an automated button cover that is automatically opened prior to an operator starting the engine of the motor vehicle and automatically closed after an operator stops the motor vehicle engine.

BACKGROUND

The concept of providing a start/stop engine button of a motor vehicle with a cover that may be manually opened or closed is known in the art. This document relates to a new and improved start/stop engine button assembly that incorporates an automated button cover that is displaceable between a closed position and an opened position by means of an actuator. Such a start/stop engine button assembly may be incorporated into substantially any motor vehicle. Advantageously, the start/stop engine button assembly is a unique feature that provides a motor vehicle owner with a better/unique driving experience. Further, in at least one possible embodiment the cover advantageously restricts access to the start/stop engine button. More specifically, children of less than a predetermined weight are denied access to the start/stop engine button thereby preventing such children from starting the engine of the motor vehicle.

SUMMARY

In accordance with the purposes and benefits described herein, a start/stop engine button assembly is provided. That start/stop engine button assembly comprises (a) a start/stop engine button, (b) a button cover, displaceable between a closed position and an open position and (c) an actuator for displacing the button cover between the closed position and the opened position.

The start/stop engine button assembly may further include an engine button housing carrying the start/stop engine button. The actuator may be connected to the engine button housing.

The start/stop engine button assembly may further include a linkage connecting the engine button housing to the button cover. Further, the button cover may include a first sliding door and a second sliding door. In such an embodiment, the linkage may include a first link bar connecting the engine button housing to the first sliding door. Further, the linkage may include a second link bar connecting the engine button housing to the second sliding bar.

A first pivot pin may connect a first end of the first link bar to the engine button housing and a second pivot pin may connect a second end of the first link bar to the first sliding door. Still further, the start/stop engine button assembly may further include a third pivot pin connecting a third end of the second link bar to the engine button housing. Still further, the start/stop engine button assembly may include a fourth pivot pin connecting a fourth end of the second link bar to the second sliding door.

The start/stop engine button assembly may also include a guideway wherein the first sliding door and the second sliding door are displaceable along that guideway. Still further, the start/stop engine button assembly may include a trim panel around the first sliding door and the second sliding door. The guideway may be carried on the trim panel.

In at least one possible embodiment of the start/stop engine button assembly, the actuator for displacing the button cover between the closed position and the opened position is a linear actuator. That actuator may include a drive motor and a piston. The engine button housing may be carried on that piston.

In at least one possible embodiment of the start/stop engine button assembly, the start/stop engine button assembly further includes a weight sensor control module configured to only open the button cover to allow access to the start/stop engine button when an individual in a driver seat of the motor vehicle exceeds a predetermined weight. Advantageously, this feature prevents small children from starting the engine of the motor vehicle.

In accordance with an additional aspect, a start/stop engine button assembly comprises a start/stop engine button displaceable between a first position and a second position, a button cover, displaceable between a closed position, concealing the start/stop engine button in the first position, and an open position allowing access to the start/stop engine button in the second position and a linear actuator displacing the start/stop engine button and the button cover.

The start/stop engine button assembly may further include a linkage and an engine button housing. The linkage connects the engine button housing to the button cover.

Still further, the start/stop engine button assembly may include a first sliding door and a second sliding door that are displaceable along a guideway in a first plane. In addition, the engine button housing may be displaceable along a path in a second plane wherein the first plane is perpendicular to the second plane. Thus, for example, the first and second sliding doors may be displaceable in a substantially horizontal plane while the engine button housing may be displaceable in a substantially vertical plane.

In accordance with yet another aspect, a method is provided for restricting a child from starting an engine of a motor vehicle. That method comprises the steps of: a) covering a start/stop engine button of the motor vehicle with a button cover, b) displacing, by an actuator, the button cover between a closed position and an opened position and c) configuring, by a control module, to only open the button cover when an individual in a drive seat of the motor vehicle exceeds a predetermined weight.

In the following description, there are shown and described several preferred embodiments of the start/stop engine button assembly and control logic flow diagrams for its operation. As it should be realized, the start/stop engine button assembly is capable of other, different embodiments and its several details are capable of modification in various, obvious aspects all without departing from the start/stop engine button assembly as set forth and described in the following claims. Accordingly, the drawings and descriptions should be regarded as illustrious in nature and not as restrictive.

BRIEF DESCRIPTION OF THE DRAWING FIGURES

The accompanying drawing figures incorporated herein and forming a part of the specification, illustrate several aspects of the start/stop engine button assembly and together with the description serve to explain certain principles thereof.

FIG. 1b is a bottom perspective view of the start/stop engine button assembly as illustrated in FIG. 1a.

FIG. 1c is a side elevational view of the start/stop engine button assembly as illustrated in FIGS. 1a and 1b.

FIG. 2b is a side elevational view of the start/stop engine button assembly as illustrated in FIG. 2a.

Reference will now be made in detail to the present preferred embodiments of the start/stop engine button assembly, examples of which are illustrated in the accompanying drawing figures.

DETAILED DESCRIPTION

Reference is now made to FIGS. 1a-1c, 2a, 2b and 3 which illustrate the start/stop engine button assembly 10. As illustrated, that start/stop engine button assembly 10 includes a start/stop engine button 12 that may be depressed to start or stop the engine 14 of the motor vehicle.

Figure 1A:
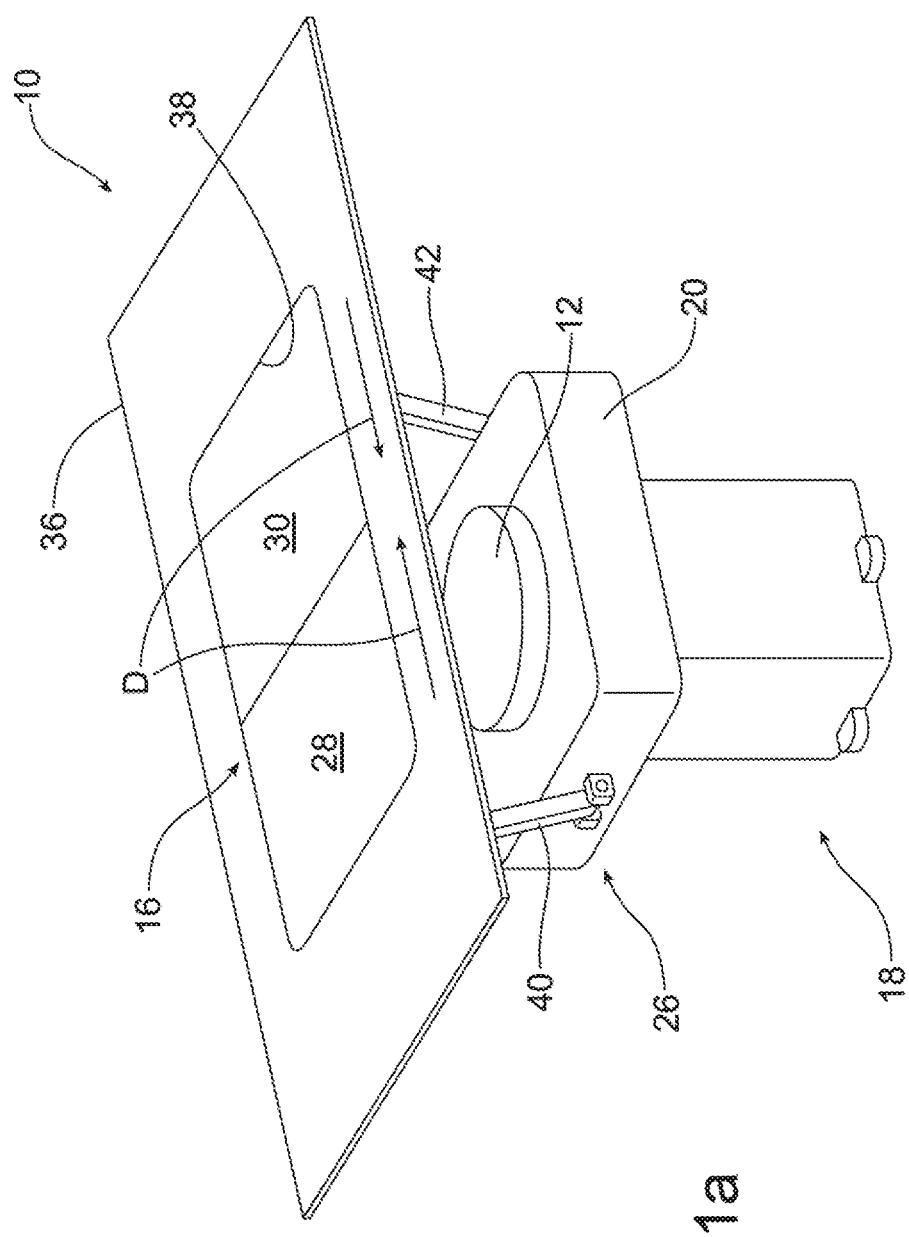
FIG. 1a is a top perspective view of the start/stop engine button assembly illustrating the sliding doors of the button cover in a closed position.
Figure 1B:
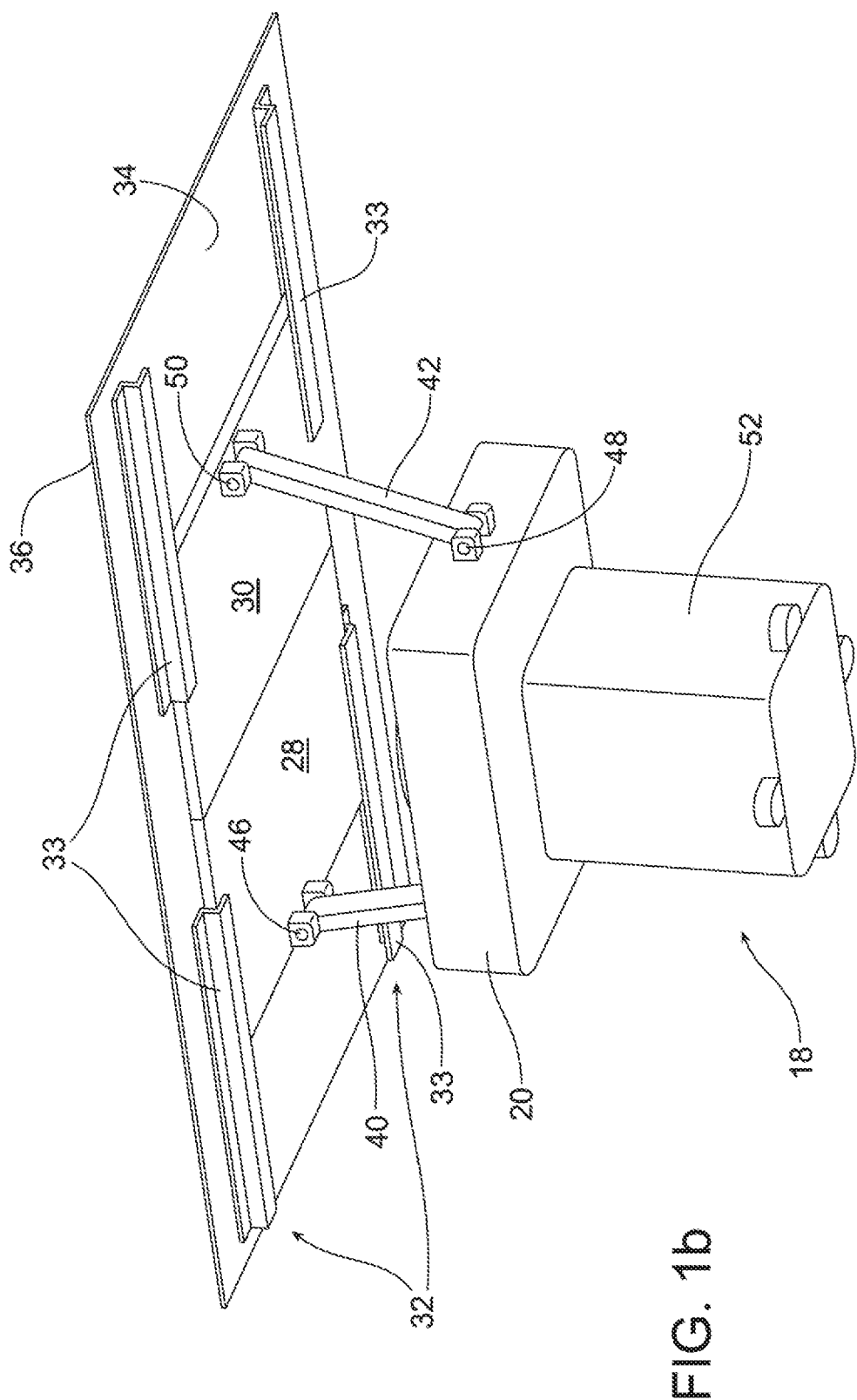
Figure 2A:
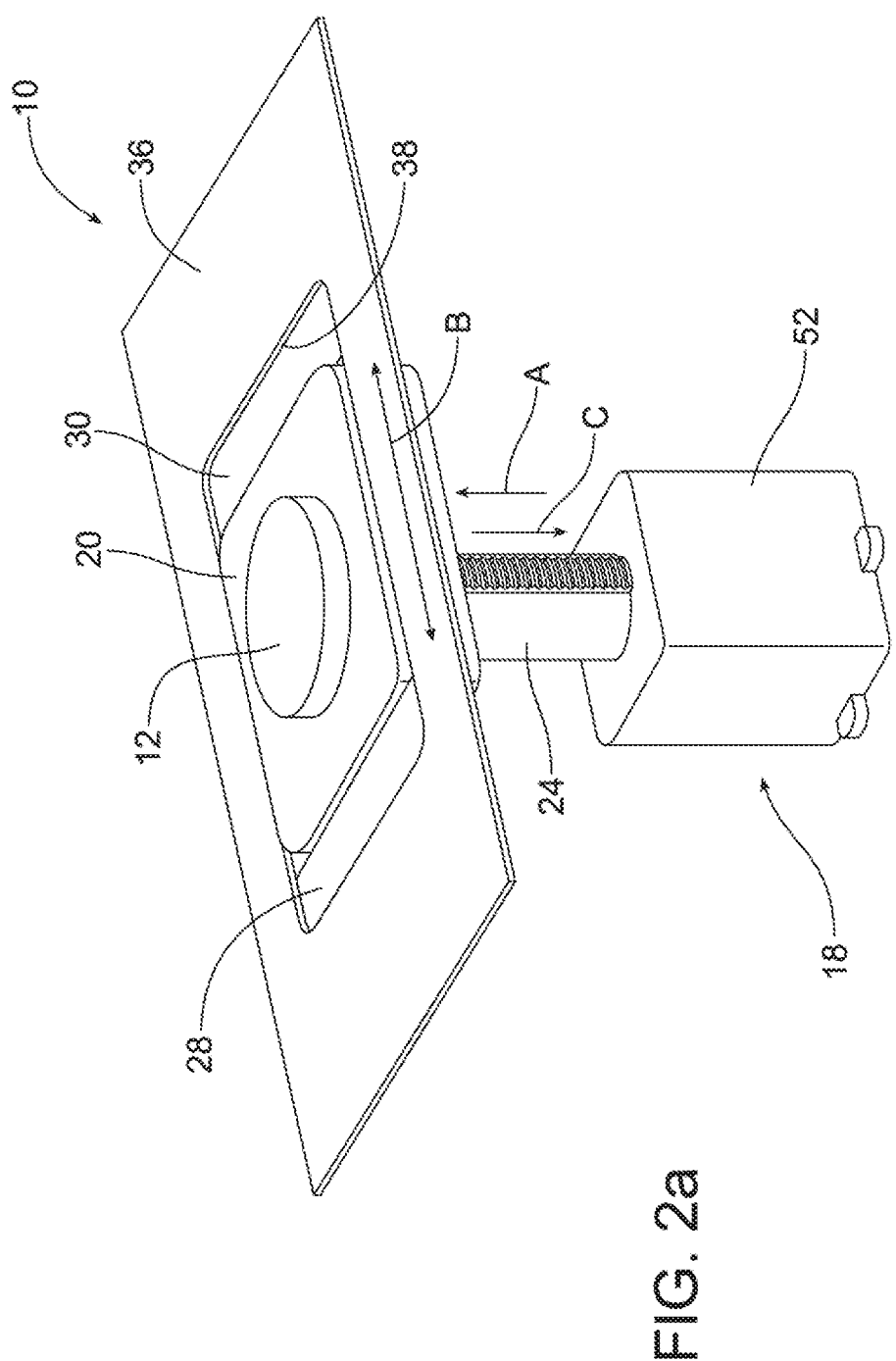
FIG. 2a is a top perspective view illustrating the start/stop engine button assembly with the sliding doors of the button cover illustrated in opened position.

The start/stop engine button assembly 10 also includes a button cover 16 that is displaceable between a closed position as illustrated in FIGS. 1a-1c wherein individuals are restricted from accessing the start/stop engine button 12, and an opened position illustrated in FIGS. 2a and 2b wherein individuals may access and depress the start/stop engine button 12 to start or stop the engine 14. The start/stop engine button assembly 10 also includes an actuator 18 that functions to displace the button cover 16 between the closed position and the opened position.

More specifically, the start/stop engine button 12 is carried on an engine button housing 20. The actuator 18 is connected to the engine button housing 20. In the illustrated embodiment, the actuator 18 comprises a linear actuator including a drive motor 22 and a driven piston 24. The drive rack 25 on the piston 24 engages a drive pinion 27 driven by the drive motor 22. The distal end of the piston 24 is connected to the engine button housing 20.

A linkage, generally designated by reference numeral 26, connects the engine button housing 20 to the button cover 16. In the illustrated embodiment, the button cover 16 includes a first sliding door 28 and a second sliding door 30. The first sliding door 28 and the second sliding door 30 are displaceable along a guideway 32. In the illustrated embodiment, the guideway 32 comprises four guide tracks 33 provided on the bottom face 34 of a trim panel 36. The trim panel 36 includes a central opening 38. When the sliding doors 28, 30 of the button cover 16 are in the closed position they close the central opening 38 in the trim panel 36, preventing access to the start/stop engine button 12 (see FIGS. 1a-1c). In contrast, when the sliding doors 28, 30 are in the opened position, the central opening 38 is opened, allowing access to the start/stop engine button 12 (see FIGS. 2a and 2b).

The linkage 26 includes a first link bar 40 and a second link bar 42. More specifically, the linkage 26 further includes a first pivot pin 44 connecting a first end of the first link bar 40 to the engine button housing 20 and a second pivot pin 46 connecting a second end of the first link bar to the first sliding door 28. In addition, the linkage 26 includes a third pivot pin 48 connecting a third end of the second link bar 42 to the engine button housing 20 and a fourth pivot pin 50 connecting a fourth end of the second link bar to the second sliding door 30.

Reference is now made to FIGS. 1a-1c illustrating the start/stop engine button assembly 10 with the button cover 16 in the closed position. In this position, the piston 24 is fully retracted into the drive motor housing 52 and the first sliding door 28 and second sliding door 30 are drawn together to close the opening 38 in the overlying trim panel 36.

In order to displace the button cover 16 into the opened position illustrated in FIGS. 2a and 2b, the piston 24 of the actuator 18 is extended by the drive motor 22 in the direction A toward the trim panel 36. As this is done the engine button housing 20 carrying the start/stop engine button 12 is raised upward in the same direction. The linkage 26 connecting the engine button housing 20 to the first sliding door 28 and the second sliding door 30 causes those doors to slide in opposed outward directions (note action arrows B) along the guideway 32. This opens the opening 38 in the trim panel 36 to receive the rising engine button housing 20. Thus, the start/stop engine button 12 on the engine button housing 20 is presented for ready access so that the operator may depress that button and start the engine 14.

When the operator has reached the desired destination, the operator again depresses the start/stop engine button 12 to stop the engine 14. The actuator 18 then functions to close the button cover 16 and conceal the start/stop engine button 12. Toward this end, the piston 24 of the actuator 18 is retracted back into the drive motor housing 52 by the drive motor 22 (note action arrow C). As the engine button housing 20 is lowered in that direction, the linkage 26 connecting the engine button housing 20 to the button cover 16 causes the cover to move to the closed position. Thus, as illustrated in FIG. 1a, the first sliding door 28 and the second sliding door 30 move toward one another in the direction of action arrows D so as to close the opening 38 in the trim panel 36 and thereby conceal the now-underlying engine button housing 20 carrying the start/stop engine button 12.

Figure 3:
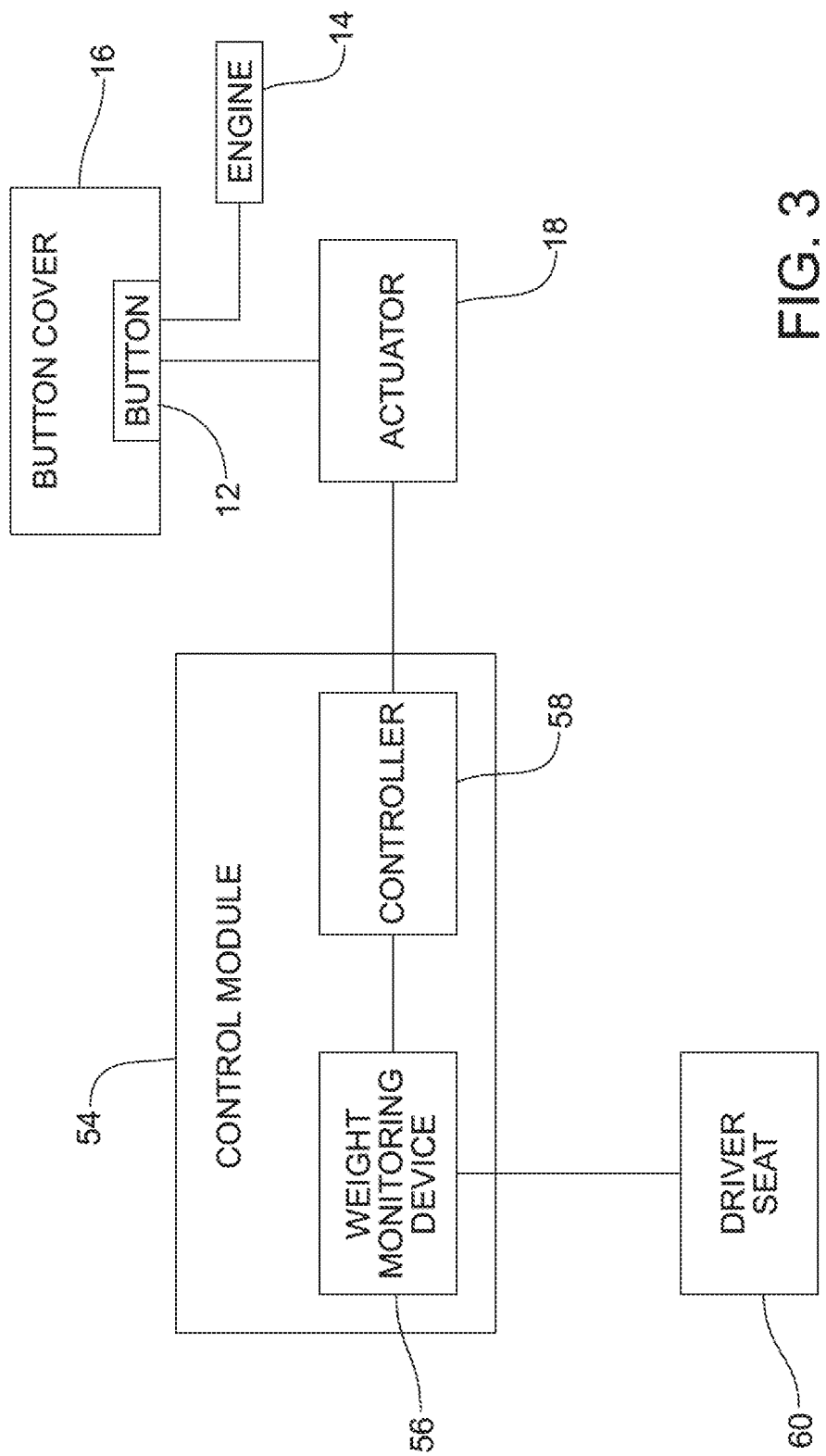
FIG. 3 is a schematic block diagram of the start/stop engine button assembly illustrating the control module system.

As illustrated in FIG. 3, the start/stop engine button assembly 10 may include a control module 54. That control module 54 may comprise a weight monitoring device 56 and a controller 58.

The weight monitoring device 56 may be of any type known in the art to be suited for monitoring the weight of any individual sitting in the driver seat 60 of the motor vehicle. Such a weight monitoring device 56 may be a part of the seatbelt monitoring system already provided in today's motor vehicles. The controller 58 may comprise a computing device such as a dedicated microprocessor or an electronic control unit (ECU) operating in accordance with instructions from appropriate control software. Thus, the controller 58 may comprise one or more processors, one or more memories and one or more network interfaces all in communication with each other over one or more communication buses.

The control module 54 may be configured to only open the button cover 16 to allow access to the start/stop engine button 12 when the individual sitting in the driver seat 60 exceeds a predetermined weight, such as, for example, 80 pounds. Any individual, including young children, that do not exceed the predetermined weight will be prevented from having access to the start/stop engine button 12 and starting or stopping the engine of the motor vehicle.

Figure 4A:
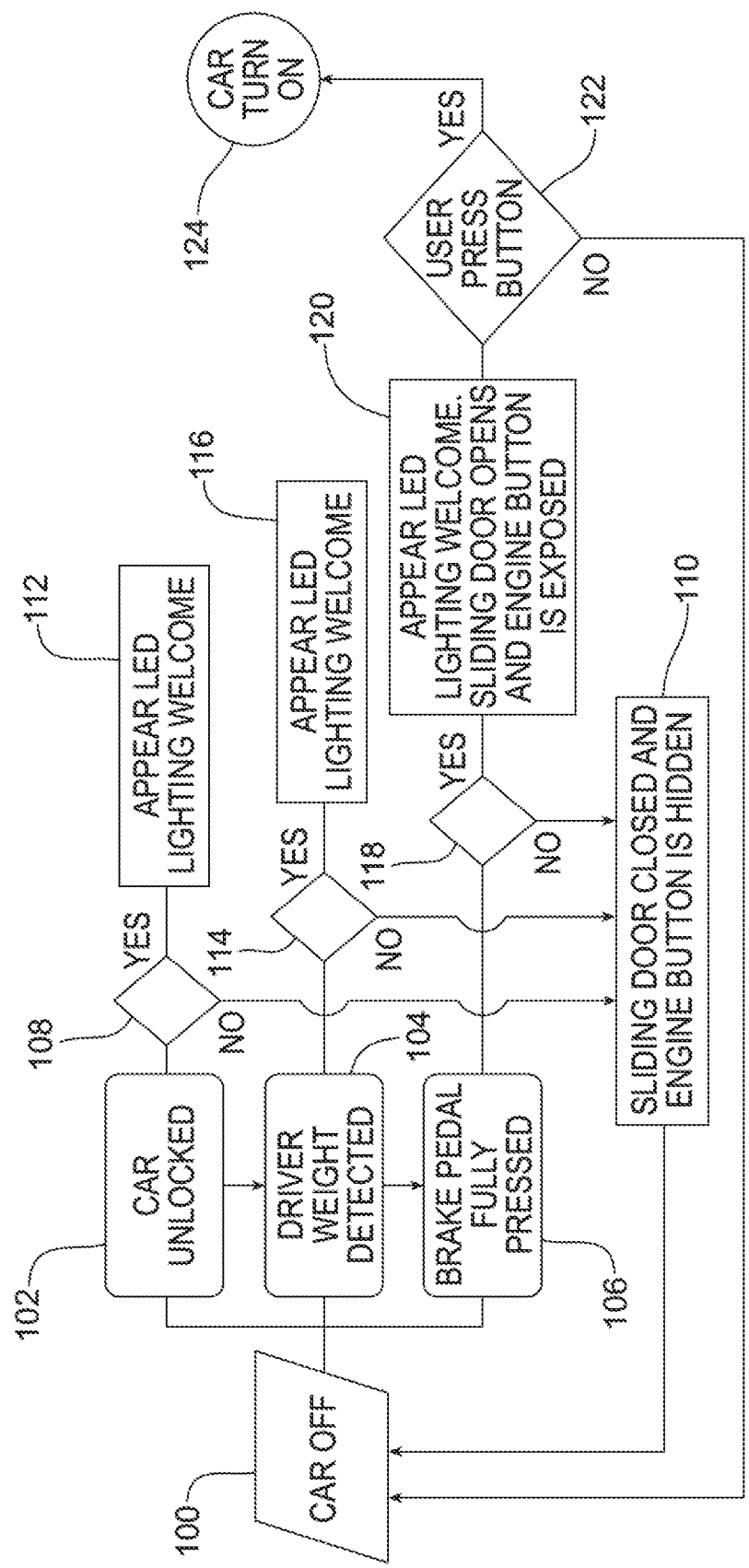
FIG. 4a is one possible control logic flow diagram respecting starting the engine of the motor vehicle with the start/stop engine button assembly.

Reference is now made to FIG. 4a illustrating one possible control logic flow diagram for starting the motor vehicle utilizing the start/stop engine button assembly 10. The control logic flow diagram is initiated at block 100 with the motor vehicle engine off.

In the illustrated embodiment, the controller 58 of the control module 54 is connected to various sensors or detectors of a type known in the art for determining (a) the lock status of the driver's side door (note block 102), (b) the weight of the individual sitting in the driver seat 60 (note block 104) and (c) if the brake pedal of the motor vehicle is fully depressed (note block 106). If the driver door remains locked at box 108 the button cover 16 and, more particularly, the sliding doors 28, 30, remain closed at box 110. In contrast, if the driver door is unlocked at box 108, the motor vehicle LED lighting to welcome the driver is activated at box 112.

Next, the controller 58 queries at box 114 if the weight of the individual in the driver seat 60 exceeds the predetermined weight based upon weight data provided by the weight monitoring device 56. If the weight of the individual does not exceed the predetermined weight, the button cover 16 and, more particularly, the sliding doors 28, 30 remain in the closed position at box 110. In contrast, if the detected weight exceeds the predetermined weight, the LED lighting welcome remains activated and the controller 58 proceeds to the brake pedal query at box 118. In the event the brake pedal is not fully depressed, the button cover 16/sliding doors 28, 30 remain closed at box 110. In contrast, if the brake pedal is fully depressed the LED lighting welcome remains activated and the button cover 16/sliding doors 28, 30 are displaced into the opened position in the manner described above at box 120. At this point if the operator does not depress the start/stop engine button 12 at box 122, the motor vehicle engine 14 remains off. In contrast, if the operator depresses the start/stop engine button 12, the motor vehicle engine 14 is started at box 124.

Figure 4B:
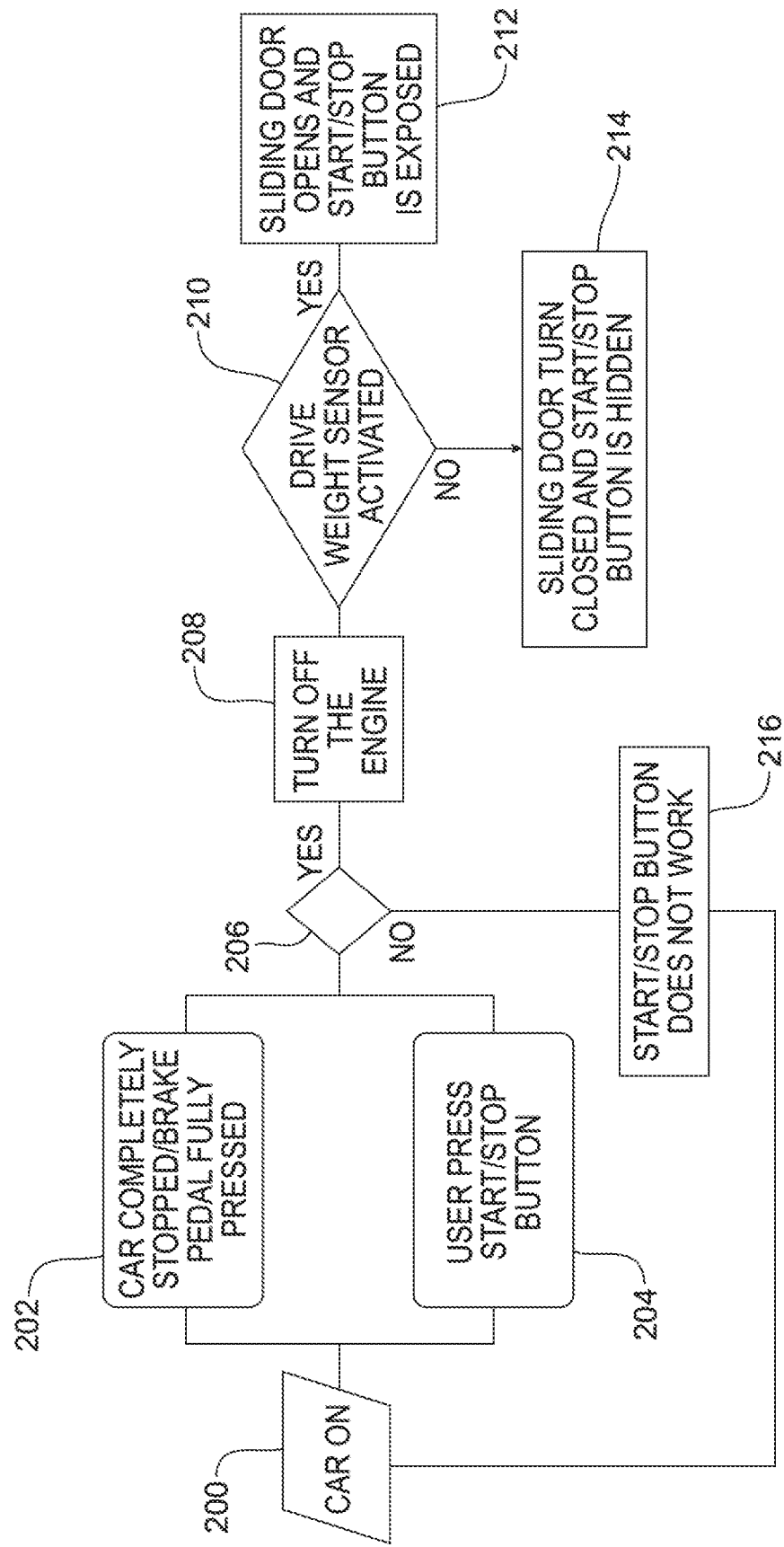
FIG. 4b is one possible control logic flow diagram respecting stopping the engine of the motor vehicle with the start/stop engine button assembly.

Reference is now made to drawing FIG. 4b illustrating one possible embodiment of control logic flow diagram for stopping the motor vehicle engine 14 utilizing the start/stop engine button assembly 10. Upon reaching the destination, the engine 14 is on at box 200. At this point the controller 58 monitors wheel speed and brake pedal position at box 202 and the position of the start/stop engine button 12 at box 204. If the controller 58 determines that the motor vehicle is stopped, the brake pedal is depressed and the user has depressed start/stop engine button 12 at query box 206, the engine 14 is turned off at box 208. The controller 58 then monitors the weight in the driver seat 60 via data from the weight monitoring device 56 at query box 210. So long as the weight exceeds the predetermined weight, the button cover 16/sliding doors 28, 30 remain open at box 212. In contrast, if the driver exits the vehicle, the weight no longer exceeds the predetermined weight and the button cover 16/sliding doors 28, 30 are closed at box 214.

Going back to box 206, whether or not the user depresses the start/stop engine button 12, if the motor vehicle is not completely stopped and/or the brake pedal is not depressed, the stop function of the start/stop engine button is defeated at box 216 and the engine 14 remains on.

It should be appreciated that the start/stop engine button assembly 10 is useful in a method for restricting a child from starting an engine 14 of a motor vehicle. That method comprises the steps of: (a) covering the start/stop engine button 12 of the motor vehicle with a button cover 16, (b) displacing, by the actuator 18, the button cover between a closed position and an opened position and (c) configuring, by the control module 54, to only open the button cover when an individual in a driver's seat of the motor vehicle exceeds a predetermined weight. In other words children of a weight less than the predetermined weight are prevented from accessing the start/stop engine button 12 by the cover 16. Thus, such children cannot start the engine 14.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A start/stop engine button assembly, comprising:
   an engine button housing;
   a start/stop engine button carried on said engine button housing;
   a sliding button cover displaceable between a closed position and an opened position;
   an actuator, sliding said sliding button cover along a first plane between said closed position and said opened position, connected to the engine button housing; and
   a linkage connecting said engine button housing to said button cover, wherein (a) said button cover includes a first sliding door and a second sliding door, (b) said linkage includes a first link bar connecting said engine button housing to said first sliding door and (c) said linkage includes a second link bar connecting said engine button housing to said second sliding door.

2. The start/stop engine button assembly of claim 1, including a first pivot pin connecting a first end of said first link bar to said engine button housing and a second pivot pin connecting a second end of said first link bar to said first sliding door.

3. The start/stop engine button assembly of claim 2, including a third pivot pin connecting a third end of said second link bar to said engine button housing and a fourth pivot pin connecting a fourth end of said second link bar to said second sliding door.

4. The start/stop engine button assembly of claim 3, further including a guideway, said first sliding door and said second sliding door being displaceable along said guideway.

5. The start/stop engine button assembly of claim 4, further including a trim panel around said first sliding door and said second sliding door, said guideway being carried on said trim panel.

6. The start/stop engine button assembly of claim 5, wherein said actuator is a linear actuator.

7. The start/stop engine button assembly of claim 5, wherein said actuator includes a drive motor and a piston.

8. The start/stop engine button assembly of claim 7, wherein said engine button housing is carried on said piston.

9. The start/stop engine button assembly of claim 1, further including a control module configured to only open the button cover to allow access to the start/stop engine button when an individual in a driver's seat of a motor vehicle exceeds a predetermined weight.

10. A start/stop engine button assembly, comprising:
    a start/stop engine button displaceable between a first position and a second position;

a sliding button cover displaceable between a closed position, concealing said start/stop engine button in said first position, and an opened position allowing access to said start/stop engine button in said second position;
a linear actuator displacing said start/stop engine button and sliding said sliding button cover along a first plane between the closed position and the opened position; and
a linkage and an engine button housing said linkage connecting said engine button housing to said button cover wherein said button cover includes a first sliding door and a second sliding door displaceable along a guideway in the first plane.

11. The start/stop engine button assembly of claim 10, wherein said engine button housing is displaceable along a path in a second plane wherein said first plane is perpendicular to said second plane.

\* \* \* \* \*